(12) United States Patent
Terazawa et al.

(10) Patent No.: US 7,104,612 B2
(45) Date of Patent: Sep. 12, 2006

(54) VEHICLE BRAKE HYDRAULIC PRESSURE GENERATOR

(75) Inventors: Tadashi Terazawa, Toyota (JP); Yoji Inoue, Toyoake (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/902,581

(22) Filed: Jul. 30, 2004

(65) Prior Publication Data
US 2005/0023891 A1    Feb. 3, 2005

(30) Foreign Application Priority Data

| Aug. 1, 2003 | (JP) | ............................. 2003-285032 |
| Aug. 1, 2003 | (JP) | ............................. 2003-285124 |
| Aug. 1, 2003 | (JP) | ............................. 2003-285178 |

(51) Int. Cl.
*B60T 8/34* (2006.01)

(52) U.S. Cl. ................................ 303/113.4; 303/113.3; 303/115.1; 91/369.1

(58) Field of Classification Search ............. 303/113.3, 303/113.4, 114.1, 115.1, 155; 188/356, 357, 188/195; 91/369.1, 369.2, 376 R, 372, 385, 91/386

See application file for complete search history.

(56) References Cited

U.S. PATENT DOCUMENTS

| 4,489,555 A | * | 12/1984 | Leiber | .......................... 60/534 |
| 5,367,942 A | * | 11/1994 | Nell et al. | ................ 303/113.4 |
| 5,653,514 A | * | 8/1997 | Castel et al. | ............. 303/113.3 |
| 6,439,674 B1 | * | 8/2002 | Niino | ........................ 303/152 |
| 6,652,040 B1 | * | 11/2003 | Oka et al. | ................ 303/114.1 |

FOREIGN PATENT DOCUMENTS

| JP | 2002-173016 | 6/2002 |
| JP | 2002173016 A | * 6/2002 |

* cited by examiner

*Primary Examiner*—Melody M. Burch
(74) *Attorney, Agent, or Firm*—Buchanan Ingersoll PC

(57) ABSTRACT

A brake hydraulic pressure generator is proposed which is simple in structure and can suppress fluctuations in the brake pedal operating amount due to fluctuations in the amount of brake fluid consumed in the brake circuit. The brake hydraulic pressure generator includes an input shaft operated by a brake pedal, a stroke simulator for imparting a stroke and a reaction force corresponding to the brake pedal operating amount to the input shaft, a master cylinder for generating brake hydraulic pressure, and a pressure detector member for applying a reaction force corresponding to the hydraulic pressure in the master cylinder to a valve member of the control valve. The reaction force is transmitted through the pressure detector member to the control member. The input to the brake pedal is transmitted to the control valve through the stroke simulator so as to oppose the reaction force. The control valve operates to balance the reaction force and the input.

3 Claims, 14 Drawing Sheets

VEHICLE BRAKE HYDRAULIC PRESSURE GENERATOR

BACKGROUND OF THE INVENTION

This invention relates to a vehicle brake hydraulic pressure generator of the type in which the output of a booster is adjusted by a control valve, and the thus adjusted output is used to produce a master cylinder pressure, thereby producing a brake hydraulic pressure corresponding to the brake pedal operating amount, and particularly a brake hydraulic pressure generator which can prevent fluctuations in the operating amount (stroke) of the brake pedal or deterioration of the brake pedal operating feeling even when the amount of brake fluid consumed in the brake circuit and/or hydraulic pressure changes. The invention further relates to a vehicle brake hydraulic pressure generator of the above-describe type further having the function of optimizing (quickly increasing) the output hydraulic pressure in the initial stage of brake operation, and/or the function of producing an increased brake hydraulic pressure only with the operating force applied by a driver when the brake booster function has been lost.

The booster in such a brake hydraulic pressure generator amplifies the brake operating force to produce an amplified master cylinder pressure. Such boosters include negative pressure types and hydraulic types. Some of brake hydraulic pressure generators including such a booster are structured such that the brake pedal operating amount directly corresponds to the amount of fluid discharged from the master cylinder. This type of generators have a drawback in that any increase in the amount of brake fluid consumed in the brake circuit at the onset of e.g. anti-lock brake control, regenerative cooperative brake control or vehicle stability control (VSC) has a direct influence on the operating amount of the brake operating means, typically a brake pedal, thus giving uncomfortableness to a driver.

In order to solve this problem, JP patent (unexamined) publication 2002-173016 proposes various brake hydraulic pressure generators which can suppress fluctuations in the brake pedal operating amount even when the amount of brake fluid consumed in the brake circuit fluctuates due to hydraulic pressure control actions not initiated by the driver.

One of the embodiments in this publication (shown in FIG. 4 of the publication) is briefly described here with reference to FIG. 14. More detailed description is found in this publication.

The brake hydraulic pressure generator of FIG. 14 includes a power plate $15a$, a valve piston $5b$ (as a second valve element) received in the power plate $15a$ so as to be axially movable relative to the power plate $15a$, and an input shaft 4 having an integral first valve element received in the valve piston $5b$. The brake hydraulic pressure generator further includes a control valve comprising an atmospheric valve seat $5b3$ formed on the first valve element, a negative pressure valve seat $5b4$ formed on the valve piston $5b$, and a valve body 5 fixed to the inner surface of the valve piston $5b$ for adjusting the output of the power plate $15a$ by controlling the pressure in a variable pressure chamber (power chamber) $15b$.

When the input shaft is pushed in, a pressure difference is produced between the variable pressure chamber $15b$ and a constant pressure chamber (negative pressure chamber) $15c$. Under this pressure difference, the power plate $15a$ is pushed toward the master cylinder under an amplified pressure. The master cylinder thus produces brake hydraulic pressure corresponding to the brake operating amount, which is supplied to the brake circuit (wheel cylinders 9). The master cylinder pressure acts on the input shaft 4 as a reaction force.

The strokes of the input shaft 4 and the valve piston $5b$ are always substantially equal to each other. The input shaft 4 stops when the thrust force applied to the valve piston $5b$ under the pressure in the variable pressure chamber $15b$ balances with the force of a spring 7. That is, the stroke of the input shaft 4 is determined by the force of the spring 7. The reaction force that opposes the brake pedal operating force is the master cylinder pressure that is applied to the tip of the input shaft 4. The master cylinder pressure is determined by the pressure in the variable pressure chamber $15b$. Thus, the relation between the stroke of the brake pedal and the reaction force applied to the brake pedal are not influenced by and can be set independently of the amount of brake fluid consumed in the brake circuit.

In this arrangement, because the first valve element, which is integral with the input shaft 4, and the second valve element (valve piston $5b$), which is axially movable relative to the first valve element, are adapted to move substantially together with each other when the brake pedal is depressed, in order to prevent fluctuations in the brake pedal operating amount due to fluctuations in the amount of brake fluid consumed in the brake circuit, it is necessary to provide a complicated stroke-power converter for controlling the position of the valve piston $5b$. This pushes up the cost and size of the entire device.

An object of this invention is to provide a hydraulic pressure generator which can suppress fluctuations in the brake pedal operating amount due to fluctuations in the amount of brake fluid consumed in the brake circuit or fluctuations in the hydraulic pressure with a simple structure, thereby achieving desirable stroke characteristics of the brake operating means.

Also, conventional brake hydraulic pressure generators have no brake pressure jump function, i.e. cannot quickly increase the brake pressure in the initial stage of brake operation, so that it is impossible to optimally control the output hydraulic pressure in the initial stage of brake operation.

Another object of this invention is therefore to provide a brake hydraulic pressure generator which has a brake pressure jump function.

When the booster function has been lost, i.e. if no negative pressure is introduced into the constant pressure chamber $15c$, the operating force applied to the brake pedal by the driver had to be transmitted to the master cylinder piston $16a$ while compressing the spring 7 and the return spring (not shown) for the power plate $15a$. That is, part of the force applied to the brake pedal is used to compress the springs, and cannot be fully used to generate brake hydraulic pressure.

A further object of the invention is therefore to provide a brake hydraulic pressure generator which is capable of generating a greater brake hydraulic pressure when the booster function has been lost.

SUMMARY OF THE INVENTION

According to this invention, there is provided a brake hydraulic pressure generator comprising a booster, an input element including an input shaft adapted to operate under an operating force applied to a brake operating member, a stroke simulator for imparting a stroke and a reaction force corresponding to an operating amount applied to the brake operating member to the input shaft, and a control valve for adjusting an output of the booster so as to correspond to the operating amount applied to the brake operating member, an output element for receiving the output of the booster, thereby producing an output, the output element being axially movable relative to the input element, a master cylinder for receiving the output of the output element, thereby producing brake hydraulic pressure, a pressure detector member for receiving the output hydraulic pressure of the master cylinder and applying to the control valve a reaction force corresponding to a force applied to the pressure detector member from the master cylinder, wherein the control valve receives an input transmitted from the brake operating member through the stroke simulator and the input shaft and the reaction force from the pressure detector member from opposite directions to each other such that the input balances with the reaction force.

Preferably, the brake hydraulic pressure generator further comprises an element for imparting resistance to movement to the pressure detector member, thereby preventing the reaction force from being transmitted to the control valve until the output hydraulic pressure of the master cylinder increases to a predetermined level.

The element for imparting resistance to movement to the pressure detector member may be a spring for biasing the pressure detector member in a direction opposite to the direction in which the reaction force is applied. If such a spring is used, a gap is provided between the pressure detector member and the control valve such that the gap is present until the output hydraulic pressure increases to a predetermined level.

If means is used which can reliably keep the pressure detector member stationary until the output hydraulic pressure of the master cylinder reaches a predetermined level, there is no need to provide a gap as mentioned above.

The booster may be a negative pressure type or a hydraulic pressure type. Preferably, the output element comprises a power plate, and the booster is a negative pressure booster comprising a variable pressure chamber into which atmospheric air is adapted to be introduced, and a constant pressure chamber connected to a negative pressure source, the pressures of the variable pressure chamber and the constant pressure chamber acting on the power plate from opposite directions to each other such that the power plate is biased under the pressure difference between the variable pressure chamber and the constant pressure chamber, and wherein the control valve is structured to absorb any fluctuations in the reaction force due to fluctuations in the amount of brake fluid consumed in a brake circuit adapted to be connected to the master cylinder, and fluctuations in the hydraulic pressure in the master cylinder by changing the stroke of the power plate.

Further preferably, the input element further comprises a valve piston in which are received the stroke simulator and the control valve, and the control valve comprises a negative pressure valve including a valve seat formed on the valve piston and a valve body movable into and out of contact with the valve seat for opening and closing a passage through which the variable pressure chamber and the constant pressure chamber communicate with each other, and an atmospheric valve including a valve member and the valve body, the valve member and the valve body being movable into and out of contact with each other for opening and closing a passage through which the variable pressure chamber communicate with outer air, the valve member being movable relative to the valve seat and the valve body to a position where the reaction force and the input balance with each other, thereby selectively opening and closing the negative pressure valve or the atmospheric valve by selectively bringing the valve body into or out of contact with the valve member or the valve seat when the amount of brake fluid consumed in the brake circuit, or the hydraulic pressure in the master cylinder fluctuates, so that the reaction force has changed.

Also preferably, the brake hydraulic pressure generator further comprises a master cylinder piston through which the output of the output member is transmitted to the master cylinder, thereby generating the hydraulic pressure in the master cylinder, wherein the reaction force is transmitted from the control valve directly to the master cylinder piston through the pressure detector member.

The mater cylinder may comprise two master cylinder pistons having different diameters and arranged such that while the device is working normally, the two master cylinder pistons are pushed simultaneously with the booster, and if the booster fails, only the small-diameter master cylinder piston is pushed with the brake operating force applied to the brake pedal by the driver.

BRIEF DESCRIPTION OF THE DRAWINGS

Other features and objects of the present invention will become apparent from the following description and the accompanying drawings, in which.

DETAILED DESCRIPTION OF THE PREFERRED EMBODIMENT

Figure 1:
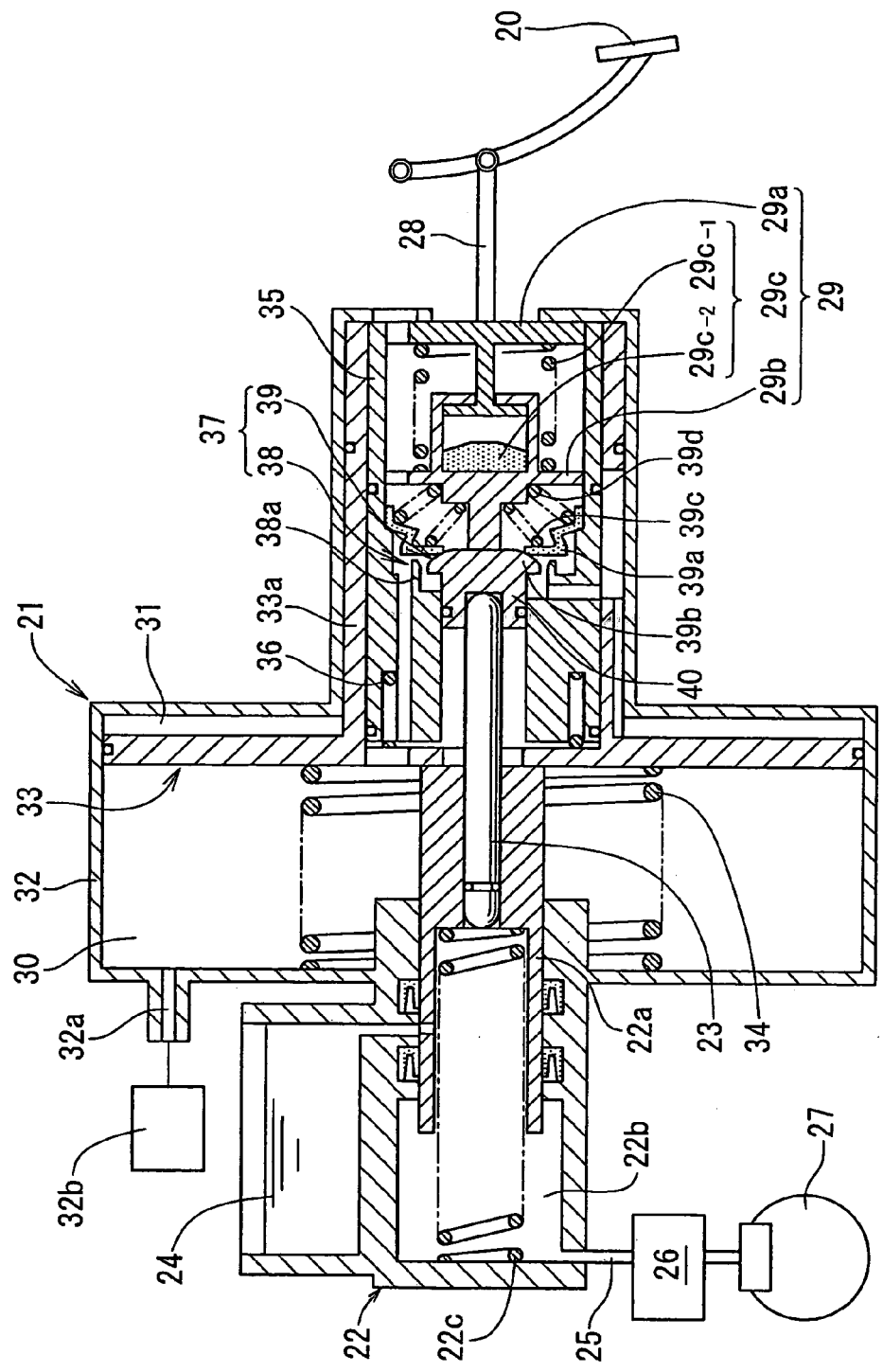
FIG. 1 is a sectional view of a brake hydraulic pressure generator according to a first embodiment of the present invention when it is not working.

FIG. 1 shows a brake system including the brake hydraulic pressure generator embodying the present invention. The latter generates brake hydraulic pressure by activating a master cylinder 22 under the output of a negative pressure booster 21.

The brake system includes a brake pedal 20, a pressure detector member 23, a reservoir 24, and brake circuits 25 (only one is shown and described) including a brake hydraulic pressure controller 26 and a wheel brake 27.

The negative pressure booster 21 comprises an input shaft 28 that is moved under the operating force applied to the brake pedal 20, a stroke simulator 29 for imparting a stroke and a reaction force corresponding to the brake pedal operating amount to the input shaft 28, a fixed shell 32, and a power plate 33 received in the fixed shell 32 and defining, in the shell 32, a constant pressure chamber 30 connected to a negative pressure source 32b such as an intake manifold through a negative pressure inlet port 32a formed in the shell 32, and a variable pressure chamber 31 into which atmospheric pressure is adapted to be introduced by an amount corresponding to the brake pedal operating amount. Pressures of the constant pressure chamber 30 and the variable pressure chamber 31 thus act on the power plate 33 from opposite directions. The power plate 33 is biased rightwardly (in FIG. 1) by a return spring 34.

A valve piston 35 is received in a cylindrical portion of the power plate 33 as an output member so as to be axially movable relative to the power plate 33 and is biased rightwardly (in FIG. 1) by a spring 36 to the position shown. The input shaft 28, the stroke simulator 29, and a control valve 37 for adjusting the pressure difference between the constant pressure chamber 30 and the variable pressure chamber 31 are all mounted in the valve piston 35. These four elements 28, 29, 30 and 31 constitute an input member.

The brake pedal 20 is biased toward the initial position by a spring (not shown) that engages the pedal 20 near its pivot point. The stroke simulator 29 comprises retainers 29a and 29b opposing each other, and an elastic member 29c disposed between the retainers 29a and 29b. Preferably, the elastic member 29c comprises a spring 29c-1 and a rubber member 29c-2 so that the reaction to the force applied to the brake pedal 20 increases to a higher level when the brake pedal has been depressed to a given extent.

The control valve 37 comprises a negative pressure valve 38 for opening and closing a passage connecting the constant pressure chamber 30 with the variable pressure chamber 31, and an atmospheric valve 39 for opening and closing a passage connecting the variable pressure chamber 31 to the outside of the fixed shell 32. The negative pressure valve 38 comprises a stretchable valve body 39a provided in the valve piston 35, and a valve seat 38a formed on the valve piston 35. The valve body 39a also serves as the valve body for the atmospheric valve 39. The atmospheric valve 39 comprises, besides the valve body 39a, a valve seat 39b formed on a valve member 40, and springs 39c and 39d disposed between the valve body 39a and the retainer 29b in a compressed state, the spring 39c biasing the valve body 39a in a direction to be pressed against the valve seats 38a and 39b, and the spring 39d retaining the valve body 39a in position.

The valve member 40 is axially movable relative to the valve piston 35. According to the axial position of the valve member 40 relative to the valve piston 35, the negative pressure valve 38 and the atmospheric valve 39 open and close.

The power plate 33 advances (moves leftwardly in FIG. 1) under the pressure difference between the variable pressure chamber 31 and the constant pressure chamber 30, thereby transmitting an amplified force corresponding to the input from the brake pedal 20 to a master cylinder piston 22a. The master cylinder piston 22a thus advances against the force of a return spring 22c, thereby producing a brake hydraulic pressure corresponding to the stroke of the brake pedal in a pressure chamber 22b.

The pressure detector member 23 moves axially under the output pressure of the master cylinder 22, thereby applying a reaction force corresponding to the output pressure of the master cylinder 22 to the valve member 40.

Under this reaction force and the input from the input shaft is applied to the valve member 40 through the stroke simulator 29 so as to oppose the reaction force, the valve member 40 adjusts the pressure difference between the constant pressure chamber 30 and the variable pressure chamber 31 such that the input balances with the reaction force.

Now, description will be made on how the brake hydraulic pressure generator operates during a normal operation, while brake fluid consumed in the brake circuit is fluctuating, and when the negative pressure booster fails.

[During Normal Operation]

While the brake pedal 20 is not being depressed, the atmospheric valve 39 is closed and the negative pressure valve 38 is open as shown in FIG. 1. Thus, the constant pressure chamber 30 and the variable pressure chamber 31 communicate with each other and they are under equal pressures, so that the power plate 33 remains at the position shown in FIG. 1.

Figure 2:
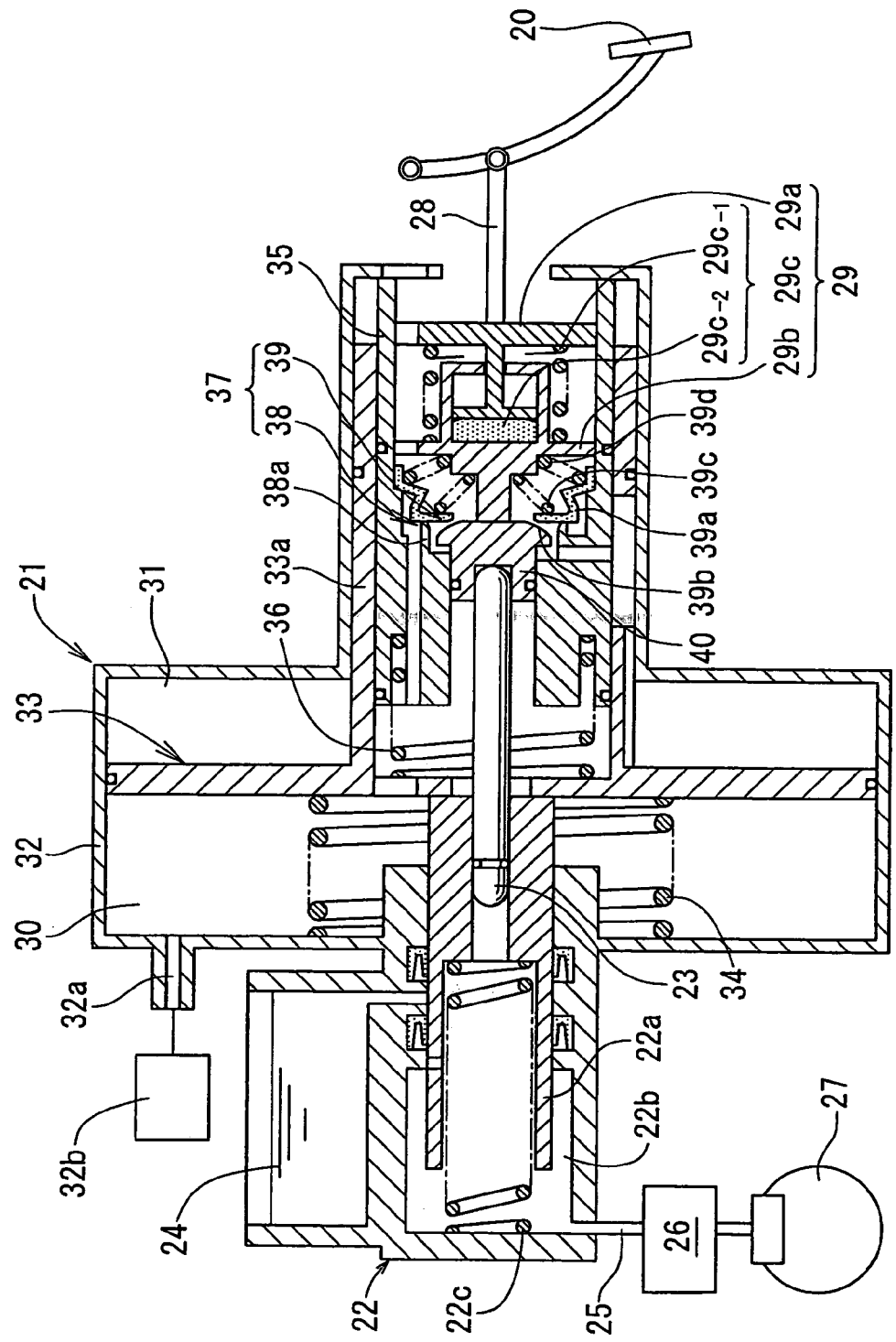
FIG. 2 is a sectional view of the brake hydraulic pressure generator of FIG. 1 when it is working normally.

When the brake pedal 20 is depressed in this state, the valve member 40 is moved leftwardly as shown in FIG. 2 by the input force transmitted to the valve member 40 through the stroke simulator 29. When the valve member 40 moves leftwardly, the valve body 39a also moves leftwardly together with the valve member 40 until it is seated on the valve seat 38a, i.e. until the negative pressure valve 38 closes, thereby shutting off communication between the constant pressure chamber 30 and the variable pressure chamber 31. As the brake pedal is further pushed in, the valve member 40 separates from the valve body 39a, so that the atmospheric valve 39 opens, thus letting atmospheric pressure into the variable pressure chamber 31. This creates a pressure difference between the constant pressure chamber 30 and the variable pressure chamber 31. This pressure difference causes the power plate 33 to advance, thus pushing the master cylinder piston 22a leftwardly in the figure. Hydraulic pressure P1 corresponding to the stroke of the brake pedal is thus produced in the pressure chamber 22b of the master cylinder 22.

The pressure detector member 23 receives the hydraulic pressure P1 at its front end, and applies a reaction force to the valve member 40 of the control valve 37, thereby biasing the valve member 40 rightwardly in the figure. The atmospheric valve 39 is kept open until this reaction force balances with the input to the brake pedal 20. When they balance, both the negative pressure valve 38 and the atmospheric valve 39 close.

The valve piston 35 is kept in the initial position by the spring 36, irrespective of the position of the power plate 33. The reaction force applied to the brake pedal is adjustable to any desired value by selecting an elastic member 29c having a proper spring constant.

During normal operation, the relations between the force F1 applied to the brake pedal 20, the elastic modulus k1 of the elastic member 29c and the stroke L1 of the input shaft 28 satisfy the equation:

$$L1 = F1/k1 \tag{1}$$

The relations between the stroke L2 of the power plate 33, the output F2 of the power plate 33 and the amount M1 of brake fluid consumed in the brake circuit satisfy the equation:

$$M1 = (F2/P1) \times L2 \tag{2}$$

The control valve 37 adjusts the amount of outer air introduced into the variable pressure chamber 31 such that the pressure applied to the pressure detector member 23 and the power plate 33 is proportional to the area ratio k2=S23/S22 (S22 is the sectional area of the master cylinder piston 22a, and S23 is the sectional area of the pressure detector member 23), irrespective of the amount of brake fluid consumed in the brake circuit. Specifically, the control valve 37 increases the amount of outer air introduced into the variable pressure chamber 31 as the amount M1 of brake fluid consumed in the brake circuit, which is given by the equation (2) above, increases. As the amount of outer air introduced into the chamber 31 increases, the stroke L2 of the power plate 33 increases, thereby balancing the input and the reaction. Thus, even if the M1 value changes, the pedal force F1 as well as the stroke L1 of the input shaft 28 (operating amount of the brake pedal) remain unchanged.

[While the Amount of Brake Fluid Consumed in the Brake Circuit and the Hydraulic Pressure are Changing]

When e.g. regenerative cooperative brake control or vehicle stability control (VSC) starts, the brake hydraulic pressure Pw in the wheel brake 27 is controlled by the brake hydraulic pressure controller 26. As a result, the amount of brake fluid consumed in the brake circuit changes from M1 to M2. The control valve 37 now adjusts the pressure difference between the constant pressure chamber 30 and the variable pressure chamber 31, thereby changing the output F2 of the power plate 33 according to the difference between M1 and M2.

For example, if the amount of brake fluid consumed in the brake circuit increases from M1 to M2, the hydraulic pressure P1 in the pressure chamber 22b increases, which increases the reaction force applied to the valve member 40 through the pressure detector member 23. The increased reaction force applied to the valve member 40 causes the negative pressure valve 38 to be opened slightly while keeping the atmospheric valve 39 shut. As a result, the pressure in the variable pressure chamber 31 decreases, causing the power plate 33 to retract. This reduces the output F2 of the power plate 33, which in turn reduces the hydraulic pressure P1 and the reaction force resulting from the hydraulic pressure P1.

The input and the reaction force that act on the valve member 40 thus balance with each other, with the pedal force F1 and the stroke L1 of the input shaft 28 substantially unchanged. The input and the reaction force can also be balanced in the same manner as above when the hydraulic pressure of the brake circuit fluctuates with the input not fluctuating.

Figure 3:
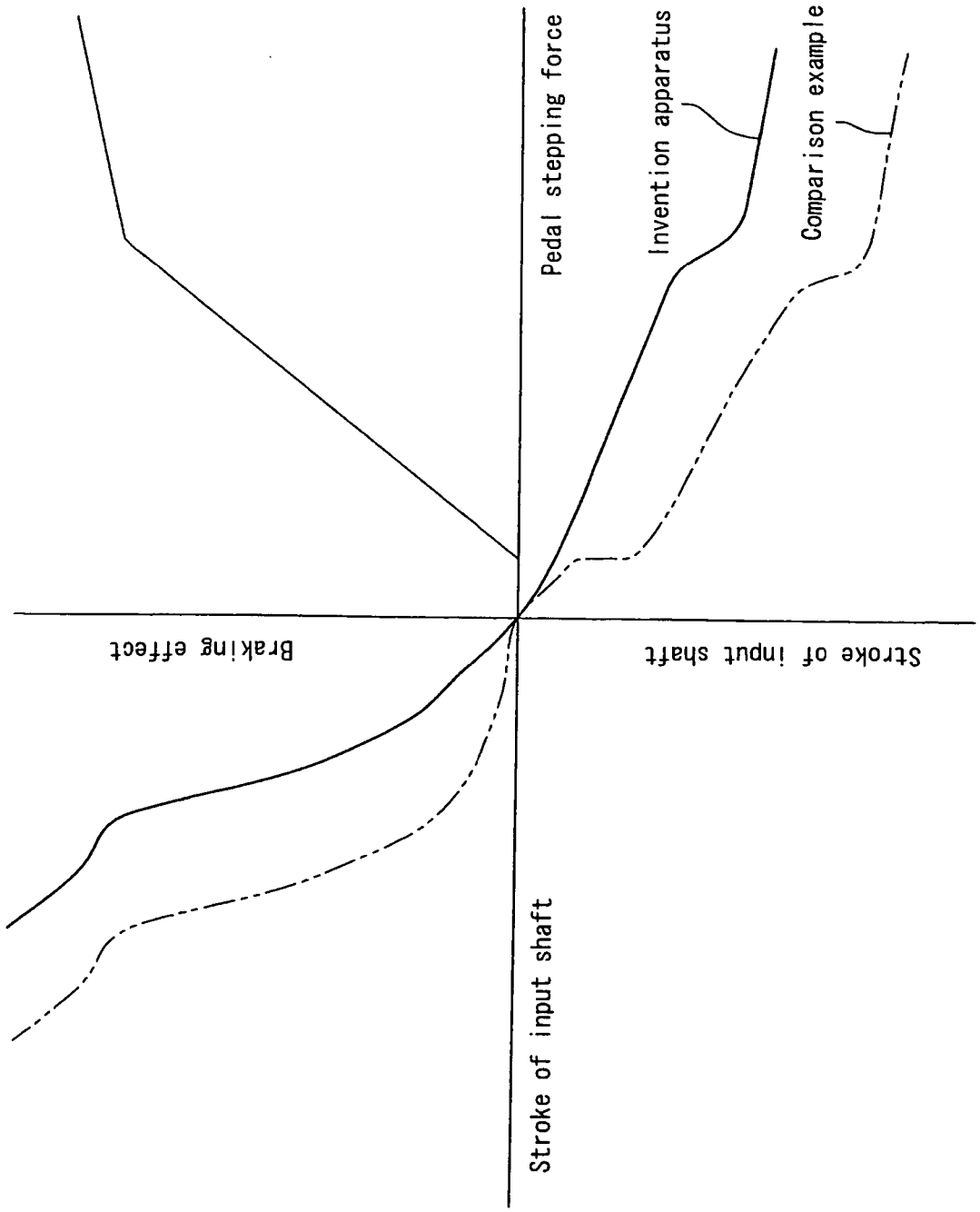
FIG. 3 is a graph showing the relationships between the stroke of the input shaft and the force applied to the brake pedal, between the stroke of the input shaft and the brake hydraulic pressure generated, and between the force applied to the brake pedal and the brake hydraulic pressure generated.

FIG. 3 shows the relationships between the stroke of the input shaft 28 and the braking force produced, between the stroke of the input shaft and the brake pedal force, and between the brake pedal force and the braking force produced. Specifically, the solid line and the two-dot chain line show these relationships for the brake hydraulic pressure generator according to the present invention, and a conventional hydraulic pressure generator including a negative pressure booster in which the operating amount of the brake pedal directly corresponds to the amount of brake fluid discharged from the master cylinder (comparison), respectively.

As is apparent from this graph, the brake hydraulic pressure generator according to the present invention can produce a greater braking force with a smaller brake pedal operating amount than the conventional one. Thus, even if brake calipers which are less likely to suffer from brake dragging are used to improve fuel economy and/or reduce brake vibrations, a sufficient braking force can be produced without unduly increasing the brake pedal stroke.

[When the Booster Function is Lost]

Figure 4:
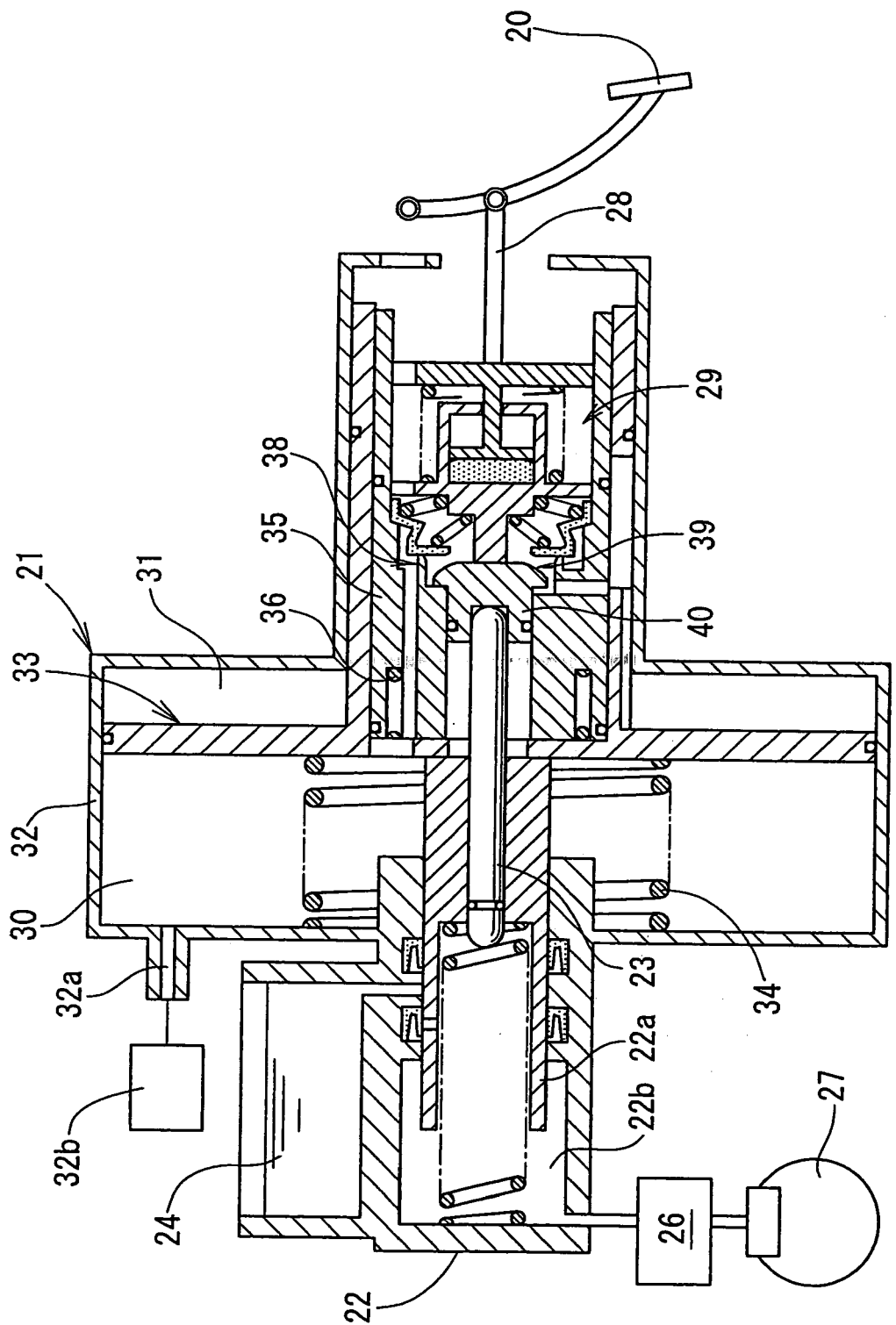
FIG. 4 is a sectional view of the hydraulic pressure generator of FIG. 1 when the booster function has been lost.

When the brake pedal 20 is depressed, the stroke simulator 29 moves leftwardly in FIG. 4 to push the valve member 40 leftwardly until it abuts the valve piston 35 as shown in FIG. 4. The valve piston 35 thus advances, i.e. moves leftwardly in the figure while compressing the spring 36 and abuts the power plate 33. Thus, through the power plate 33, the master cylinder piston 22a is pushed leftwardly in the figure. Thus, even though no assisting force is applied because the booster function is lost and no negative pressure is being introduced into the constant pressure chamber 30, it is possible to produce at least a minimum necessary braking force by directly activating the master cylinder 22 with the operating force applied to the brake pedal by the driver.

Figure 5:
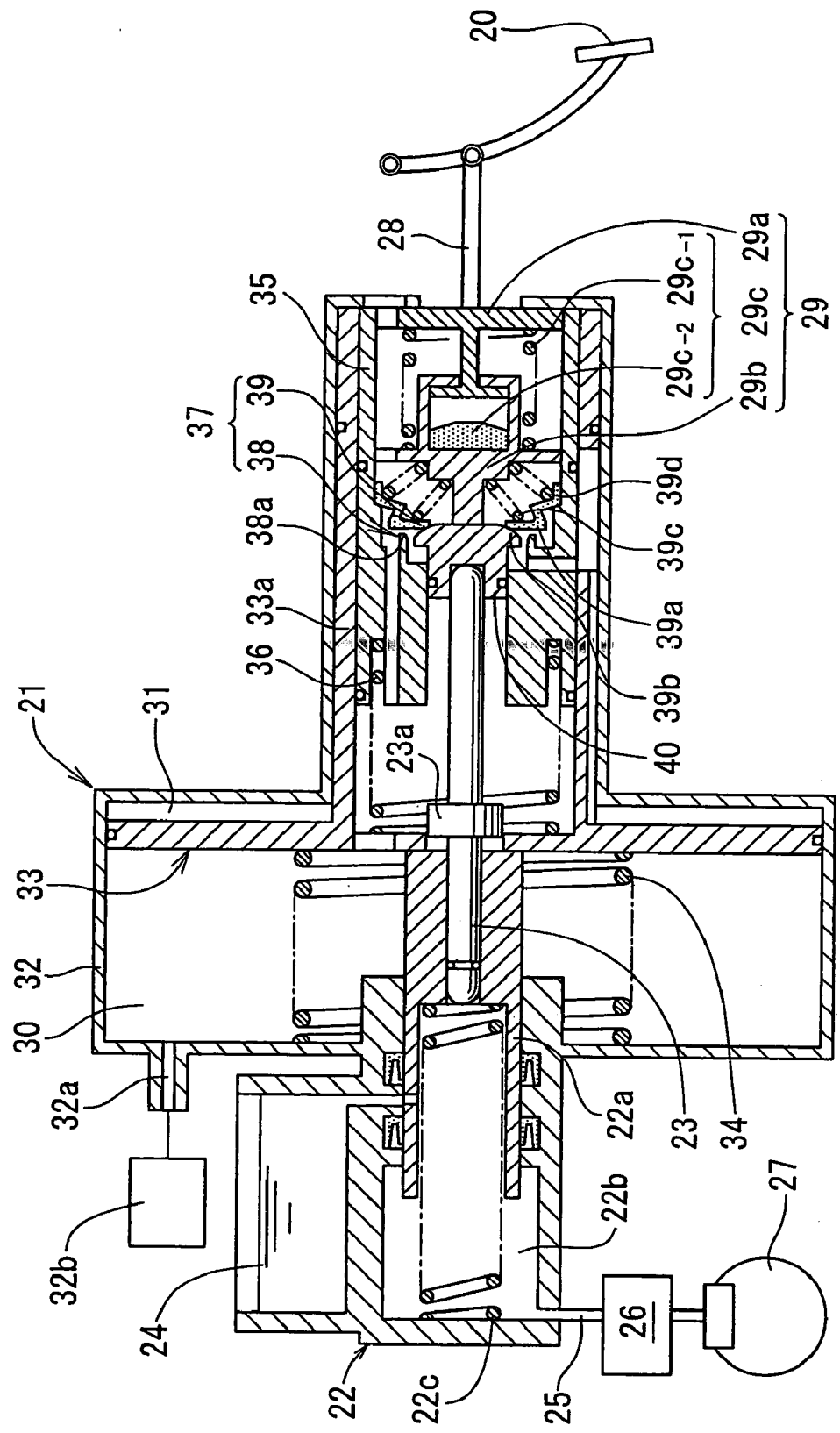
FIG. 5 is a sectional view of a brake hydraulic pressure generator of a second embodiment according to this invention.

FIG. 5 shows a brake hydraulic pressure generator according to the second embodiment of the present invention. This embodiment is structurally the same as the first embodiment except the below-described points. Like parts and elements are therefore denoted by like numerals, and their description is mostly omitted.

As in the first embodiment, the pressure detector member 23 moves axially under the output pressure of the master cylinder 22, thereby applying a reaction force corresponding to the output pressure of the master cylinder 22 to the valve member 40. As shown in FIG. 5, the pressure detector member 23 of the second embodiment has a bulge 23a at its longitudinal intermediate portion. The bulge 23a is adapted to abut the rear end of the master cylinder piston 22a. With this arrangement, after the bulge 23a has abutted the rear end of the master cylinder piston 22a, the input to the valve member 40 is directly transmitted to the master cylinder piston 22a through the pressure detector member 23.

The valve member 40 receives an input from the input shaft 28 through the stroke simulator 29 and the reaction force, which is opposite to the input, and adjusts the pressure difference between the constant pressure chamber 30 and the variable pressure chamber 31 so that the reaction force always balances with the input.

Figure 6:
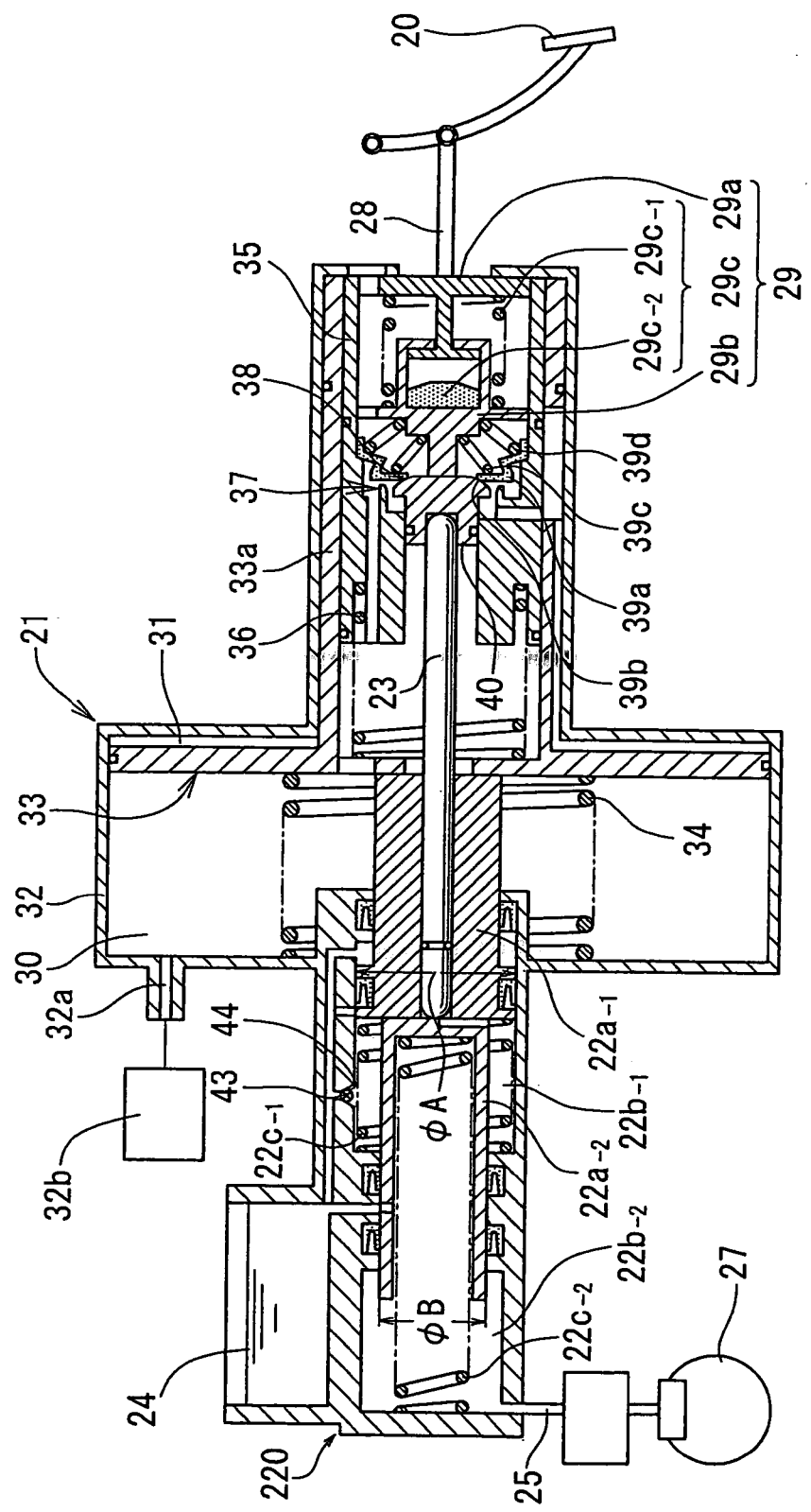
FIG. 6 is a sectional view of a modification of the second embodiment.

FIG. 6 shows a modification of the second embodiment. The master cylinder 220 of this modified example has two separate pistons, i.e. a large-diameter master cylinder piston 22a-1 having an outer diameter A and a small-diameter master cylinder piston 22a-2 having an outer diameter. The large-diameter master cylinder piston 22a-1, biased by a return spring 22c-1, pressurizes brake fluid in a first pressure chamber 22b-1. The small-diameter master cylinder piston 22a-2, biased by a return spring 22c-2, pressurizes brake fluid in a second pressure chamber 22b-2. The large-diameter master cylinder piston 22a-1 and the small-diameter master cylinder piston 22a-2 are arranged in series. When force is applied to the large-master cylinder piston 22a-1 from the power plate 33, the small-diameter master cylinder piston 22a-2 is simultaneously pushed under the pressure of the first pressure chamber 22b-1. The first pressure chamber 22b-1 communicates with the reservoir 24 through a passage 44 having a check valve 43 (which may be a relief valve instead).

The pressure detector member 23 extends through the large-diameter cylinder piston 22a-1 so that the pressure of the first pressure chamber 22b-1 acts on the front end of the member 23 as a reaction force. If the booster function is lost, the input to the valve member 40 is transmitted to the pressure detector member 23 and then directly to the small-diameter master cylinder piston 22a-2. Brake fluid is supplied from the reservoir 24 into the first pressure chamber 22b-1 through the check valve 43.

The brake hydraulic pressure generator of FIG. 6 is structurally identical to the one of FIG. 5. Thus, like elements are denoted by like numerals and their description are omitted.

Description is now made on how the brake hydraulic pressure generators of FIGS. 5 and 6 operate during a normal operation, while the amount of brake fluid consumed in the brake circuit is fluctuating, and when the negative pressure booster fails.

[During Normal Operation]

In the case of the brake hydraulic pressure generator of FIG. 5, while the brake pedal 20 is not being depressed, the atmospheric valve 39 is closed and the negative pressure valve 38 is open. Thus, the constant pressure chamber 30 and the variable pressure chamber 31 communicate with each other and they are under equal pressures, so that the power plate 33 remains at the initial position shown in FIG. 5.

When the brake pedal 20 is depressed in this state, the valve member 40 is moved leftwardly in the figure by the input force transmitted to the valve member 40 through the stroke simulator 29. When the valve member 40 moves leftwardly, the valve body 39a also moves leftwardly together with the valve member 40 until it is seated on the valve seat 38a, i.e. until the negative pressure valve 38 closes, thereby shutting off communication between the constant pressure chamber 30 and the variable pressure chamber 31. As the brake pedal is further pushed in, the valve member 40 separates from the valve body 39a, so that the atmospheric valve 39 opens, thus letting atmospheric pressure into the variable pressure chamber 31. This creates a pressure difference between the constant pressure chamber 30 and the variable pressure chamber 31. This pressure difference causes the power plate 33 to advance, thus pushing the master cylinder piston 22a leftwardly in the figure. Hydraulic pressure P1 corresponding to the stroke of the brake pedal is thus produced in the pressure chamber 22b of the master cylinder 22.

The pressure detector member 23 receives the hydraulic pressure P1 at its front end, and applies a reaction force to the valve member 40 of the control valve 37, thereby biasing the valve member 40 rightwardly in the figure. The atmospheric valve 39 is kept open until this reaction force balances with the input from the brake pedal 20. When they balance, the atmospheric valve 39 closes.

The valve piston 35 is kept in the initial position by the spring 36, irrespective of the position of the power plate 33. The reaction force applied to the brake pedal is adjustable to any desired value by selecting an elastic member 29c having a proper spring constant.

During normal operation, the relations between the force F1 applied to the brake pedal 20, the elastic modulus k1 of the elastic member 29c and the stroke L1 of the input shaft 28 satisfy the equation:

$$L1 = F1/k1 \tag{1}$$

The relations between the stroke L2 of the power plate 33, the output F2 of the power plate 33 and the amount M1 of brake fluid consumed in the brake circuit satisfy the equation:

$$M1 = (F2/P1) \times L2 \tag{2}$$

The control valve 37 adjusts the amount of outer air introduced into the variable pressure chamber 31 such that the pressure applied to the pressure detector member 23 and the power plate 33 is proportional to the area ratio k2=S23/S22 (S22 is the sectional area of the master cylinder piston 22a, and S23 is the sectional area of the pressure detector member 23), irrespective of the amount of brake fluid consumed in the brake circuit. Specifically, the control valve 37 increases the amount of outer air introduced into the variable pressure chamber 31 as the amount M1 of brake fluid consumed in the brake circuit, which is given by the equation (2) above, increases. As the amount of outer air introduced into the chamber 31 increases, the stroke L2 of the power plate 33 increases, thereby balancing the input and the reaction force. Thus, even if the M1 value changes, the pedal force F1 and the stroke L1 of the input shaft 28 (brake pedal operating amount) remain unchanged.

[While the Amount of Brake Fluid Consumed in the Brake Circuit and the Hydraulic Pressure are Changing]

When e.g. regenerative cooperative brake control or vehicle stability control (VSC) starts, the brake hydraulic pressure Pw in the wheel brake 27 is controlled by the brake hydraulic pressure control device 26. As a result, the amount of brake fluid consumed in the brake circuit changes from M1 to M2. The control valve 37 now adjusts the pressure difference between the constant pressure chamber 30 and the variable pressure chamber 31, thereby changing the output F2 of the power plate 33 according to the difference between M1 and M2.

For example, if the amount of brake fluid consumed in the brake circuit increases from M1 to M2, the hydraulic pressure P1 in the pressure chamber 22b increases, which increases the reaction force applied to the valve member 40 through the pressure detector member 23. The increased reaction force applied to the valve member 40 causes the negative pressure valve 38 to be opened slightly while keeping the atmospheric valve 39 shut. As a result, the pressure in the variable pressure chamber 31 decreases, causing the power plate 33 to retract. This reduces the output F2 of the power plate 33, which in turn reduces the hydraulic pressure P1 and the reaction force resulting from the hydraulic pressure P1.

The input and the reaction force that act on the valve member 40 thus balance with each other, with the pedal force F1 and the stroke L1 of the input shaft 28 substantially unchanged. The input and the reaction force can also be balanced in the same manner as above when the hydraulic pressure of the brake circuit fluctuates with the input not fluctuating.

Figure 7:
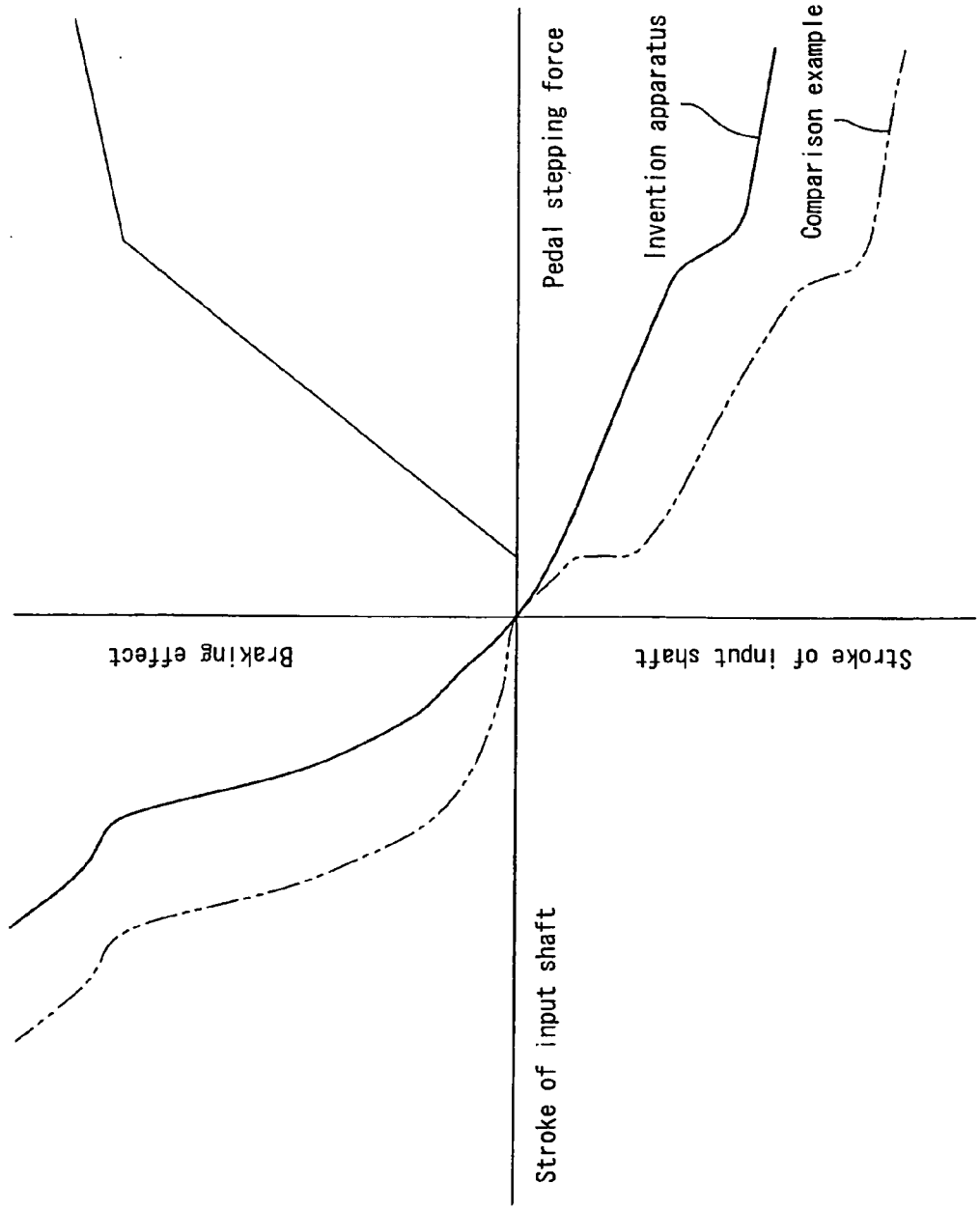
FIG. 7 is a graph showing, for the second embodiment, the relationships between the stroke of the input shaft and the force applied to the brake pedal, between the stroke of the input shaft and the brake hydraulic pressure generated, and between the force applied to the brake pedal and the brake hydraulic pressure generated.

FIG. 7 shows the relationships between the stroke of the input shaft 28 and the braking force produced, between the stroke of the input shaft and brake pedal force, and between the brake pedal force and the braking force produced. Specifically, the solid line and the two-dot chain line show these relationships for the brake hydraulic pressure generator according to the present invention, and a conventional hydraulic pressure generator including a negative pressure booster in which the operating amount of the brake pedal directly corresponds to the amount of brake fluid discharged from the master cylinder (comparison), respectively.

As is apparent from this graph, the brake hydraulic pressure generator according to the present invention can produce a greater braking force with a smaller brake pedal operating amount than the conventional one. Thus, even if brake calipers which are less likely to suffer from brake dragging are used to improve fuel economy and/or reduce brake vibrations, a sufficient braking force can be produced without unduly increasing the brake pedal stroke.

The brake hydraulic pressure generator of FIG. 6 differs from that of FIG. 5 in that brake fluid is pressurized by two master cylinder pistons, i.e. the large-diameter one 22a-1 and the small-diameter one 22a-2. But its behavior during normal operation and while the amount of brake fluid consumed in the brake circuit is fluctuating is substantially identical to the behavior of the brake hydraulic pressure generator of FIG. 5.

[When the Booster Function is Lost]

Brake Hydraulic Pressure Generator of FIG. 5

Figure 8:
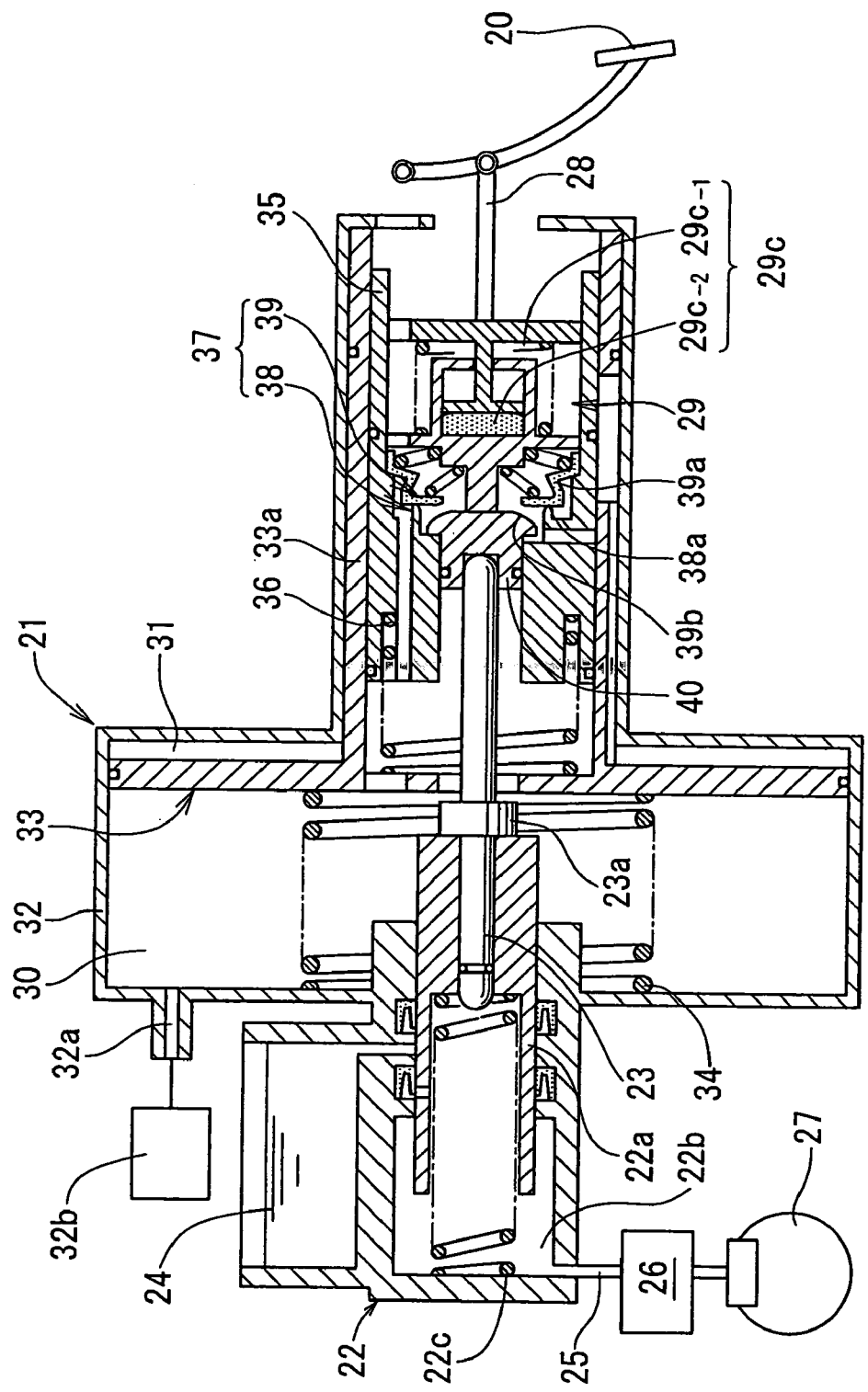
FIG. 8 is a sectional view of the brake hydraulic pressure generator of FIG. 5 when the booster has failed.

When the brake pedal 20 is depressed, the stroke simulator 29 moves leftwardly in FIG. 8 to push the valve member 40 leftwardly until it abuts the valve piston 35. The input is thus transmitted to the valve piston 35. Since the force of the spring 36 is weaker than the force of the return spring 34, the valve piston 35 advances leftwardly in the figure together with the stroke simulator 29 and the control valve 37. The brake operating force applied to the brake pedal by the driver is thus transmitted directly to the master cylinder piston 22a through the pressure detector member 23. In this state, no negative pressure is being supplied into the constant pressure chamber 30, so that the negative pressure booster 21 is producing no assisting force. But because the force of the return spring 34 does not act against the operating force applied by the driver, it is possible to directly activate the master cylinder 22 with the operating force applied by the driver with a minimum loss. Thus, it is possible to produce a high brake hydraulic pressure with a lower manual braking effort even when the booster has failed.

Brake Hydraulic Pressure Generator of FIG. 6

When the booster function has been lost, under the force applied to the brake pedal, the valve piston 35 is pushed in with the power plate 33 kept in its initial position. The input is thus transmitted to the small-diameter master cylinder 22a-2 through the pressure detector member 23. During normal operation, the effective diameter of the pressure-bearing surface is equal to the diameter A of the large-diameter master cylinder piston 22a-1. Thus, it is possible to pressurize a large amount of brake fluid. When the booster function has been lost, the effective diameter of the pressure-bearing surface decreases to the diameter B of the small-diameter master cylinder piston 22a-2. Thus, it is possible to generate a sufficiently high hydraulic pressure with a small stroke, though the amount of hydraulic fluid pressurized is small.

Figure 9:
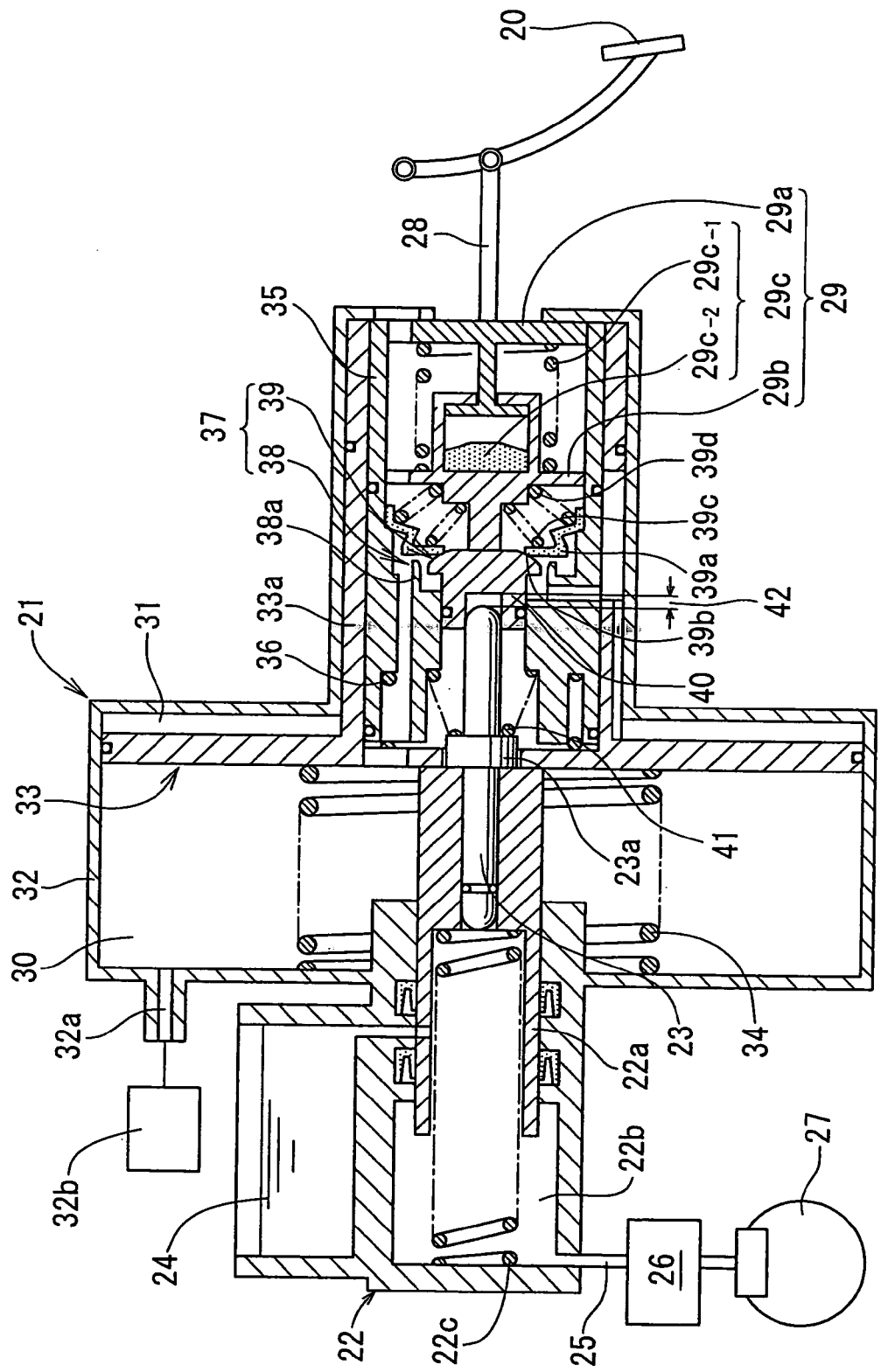
FIG. 9 is a sectional view of a brake hydraulic pressure generator according to a third embodiment of the present invention, when it is not working.
Figure 10:
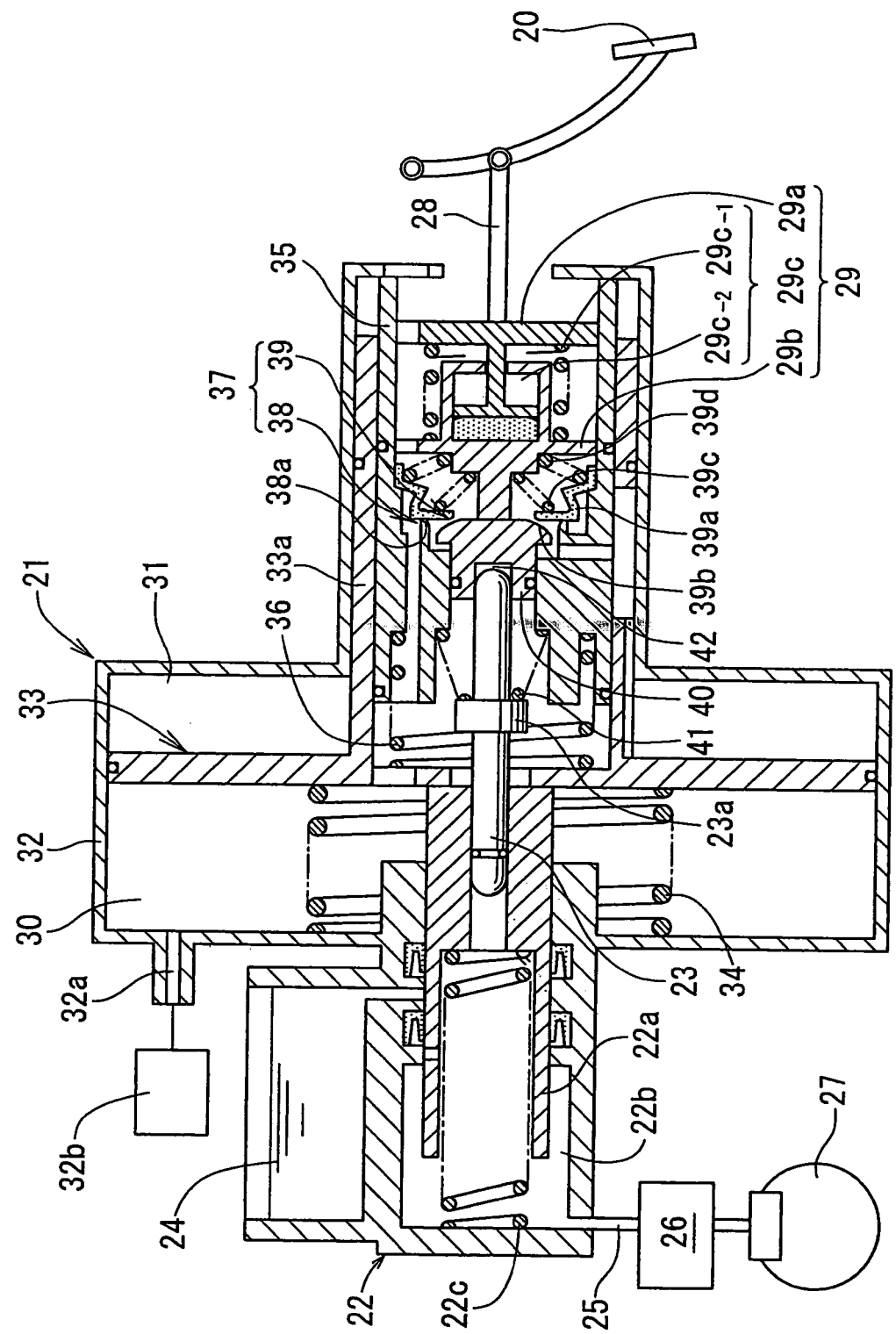
FIG. 10 is a sectional view of the brake hydraulic pressure generator of FIG. 9 in the initial stage of brake pedal operation.
Figure 11:
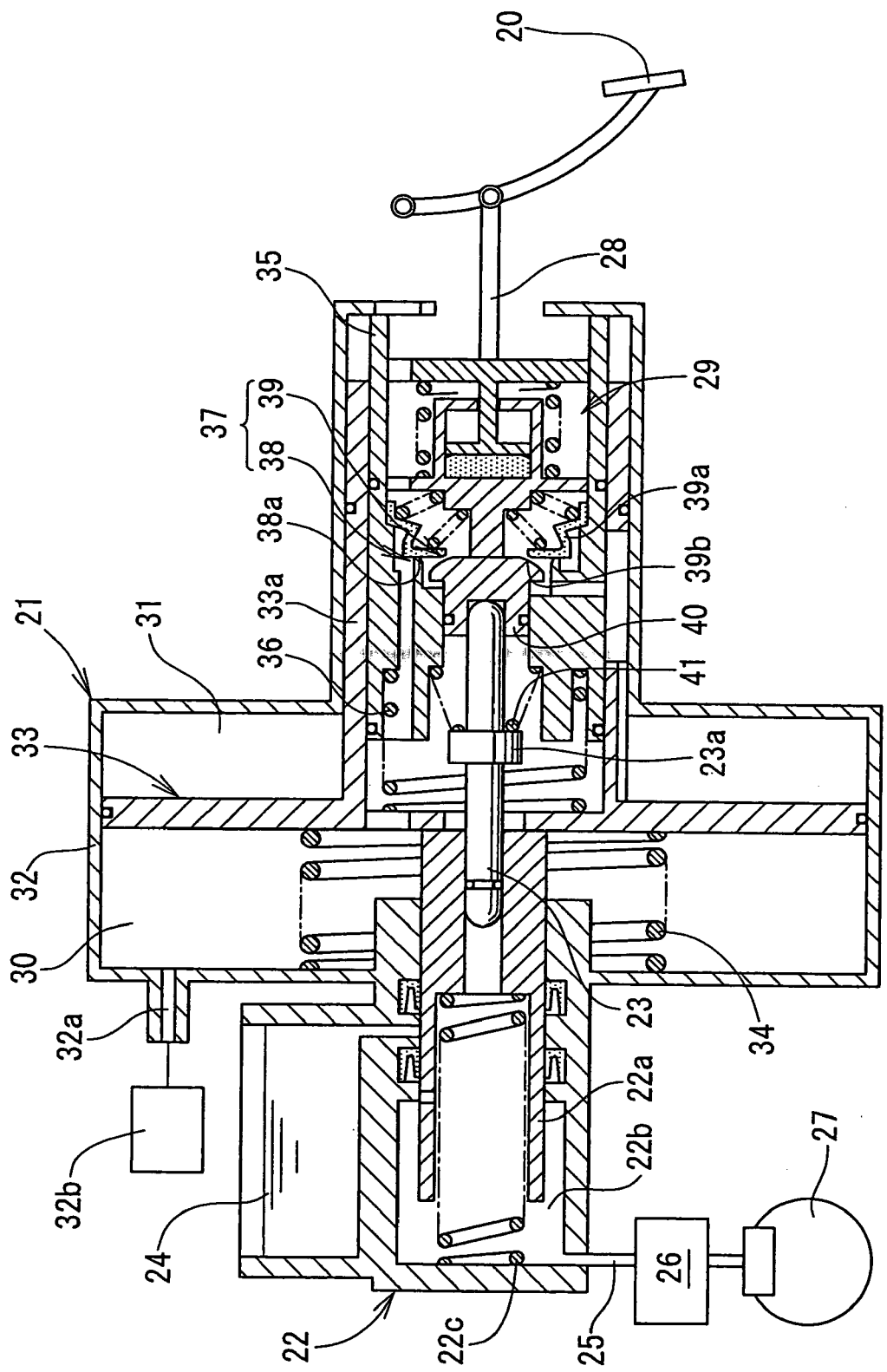
FIG. 11 is a sectional view of the brake hydraulic pressure generator of FIG. 9 when the reaction force is being controlled so as to balance with the input.

FIGS. 9–11 show a brake hydraulic pressure generator according to the third embodiment of the present invention. As with the second embodiment, this embodiment is structurally substantially the same as the first embodiment except the below-described points. Like parts and elements are therefore denoted by like numerals, and their description is mostly omitted.

As in the first embodiment, the pressure detector member 23 of this embodiment applies a reaction force corresponding to the (output) hydraulic pressure generated in the master cylinder 22 to the valve member 40. An elastic member (such as a spring as shown) 41 is disposed between the pressure detector member 23 and the valve piston 35. The elastic member 41 serves as a means for imparting resistance to the movement of the pressure detector member 23 in the direction in which the reaction force is transmitted. In the initial position, i.e. while the brake pedal is not being depressed, a gap 42 is present between the pressure detector member 23 and the valve member 40. With this arrangement, until the output hydraulic pressure of the master cylinder 22 increases to a predetermined level, the gap 42 is maintained under the spring force of the elastic member 41. As long as the gap 42 exists, the reaction force applied to the pressure detector member 23 is not transmitted to the valve member 40.

Now, for the brake hydraulic pressure generator of the third embodiment, description will be made on how the brake hydraulic pressure generator operates during a normal operation, while brake fluid consumed in the brake circuit is fluctuating, and when the negative pressure booster fails.

[During Normal Operation]

While the brake pedal 20 is not being depressed, the atmospheric valve 39 is closed and the negative pressure valve 38 is open as shown in FIG. 9. Thus, the constant pressure chamber 30 and the variable pressure chamber 31 communicate with each other and they are under equal pressures, so that the power plate 33 remains at the position shown in FIG. 1.

When the brake pedal 20 is depressed in this state, the valve member 40 is moved leftwardly by the input force transmitted to the valve member 40 through the stroke simulator 29. When the valve member 40 moves leftwardly, the valve body 39a also moves leftwardly together with the valve member 40 until it is seated on the valve seat 38a, i.e. until the negative pressure valve 38 closes, thereby shutting off communication between the constant pressure chamber 30 and the variable pressure chamber 31. As the brake pedal is further pushed in, the valve member 40 separates from the valve body 39a, so that the atmospheric valve 39 opens, thus letting atmospheric pressure into the variable pressure chamber 31. This creates a pressure difference between the constant pressure chamber 30 and the variable pressure chamber 31. This pressure difference causes the power plate 33 to advance, thus pushing the master cylinder piston 22a leftwardly in the figure. Hydraulic pressure P1 is thus produced in the pressure chamber 22b of the master cylinder 22.

Under the hydraulic pressure generated in the pressure chamber 22b, which acts on the front end of the pressure detector member 23, the pressure detector member 23 is moved rightwardly in the figure. But initially, the pressure detector member 23 is separated from the valve member by the gap 42 as shown in FIG. 10, so that the reaction force is not transmitted to the valve member 40 of the control valve 37. Only after the elastic member 41 has been compressed until the gap 42 disappears, the reaction force is transmitted to the valve member 40. While no reaction force is being transmitted to the valve member 40, the atmospheric valve 39 is kept open, i.e. never closes. Thus, in this state, even without increasing the input to the brake pedal 20, the output of the negative pressure booster 21, and thus the output hydraulic pressure in the master cylinder 22 quickly increase (jump) because atmospheric air is continuously introduced into the variable pressure chamber 31 without interruption.

Figure 12:
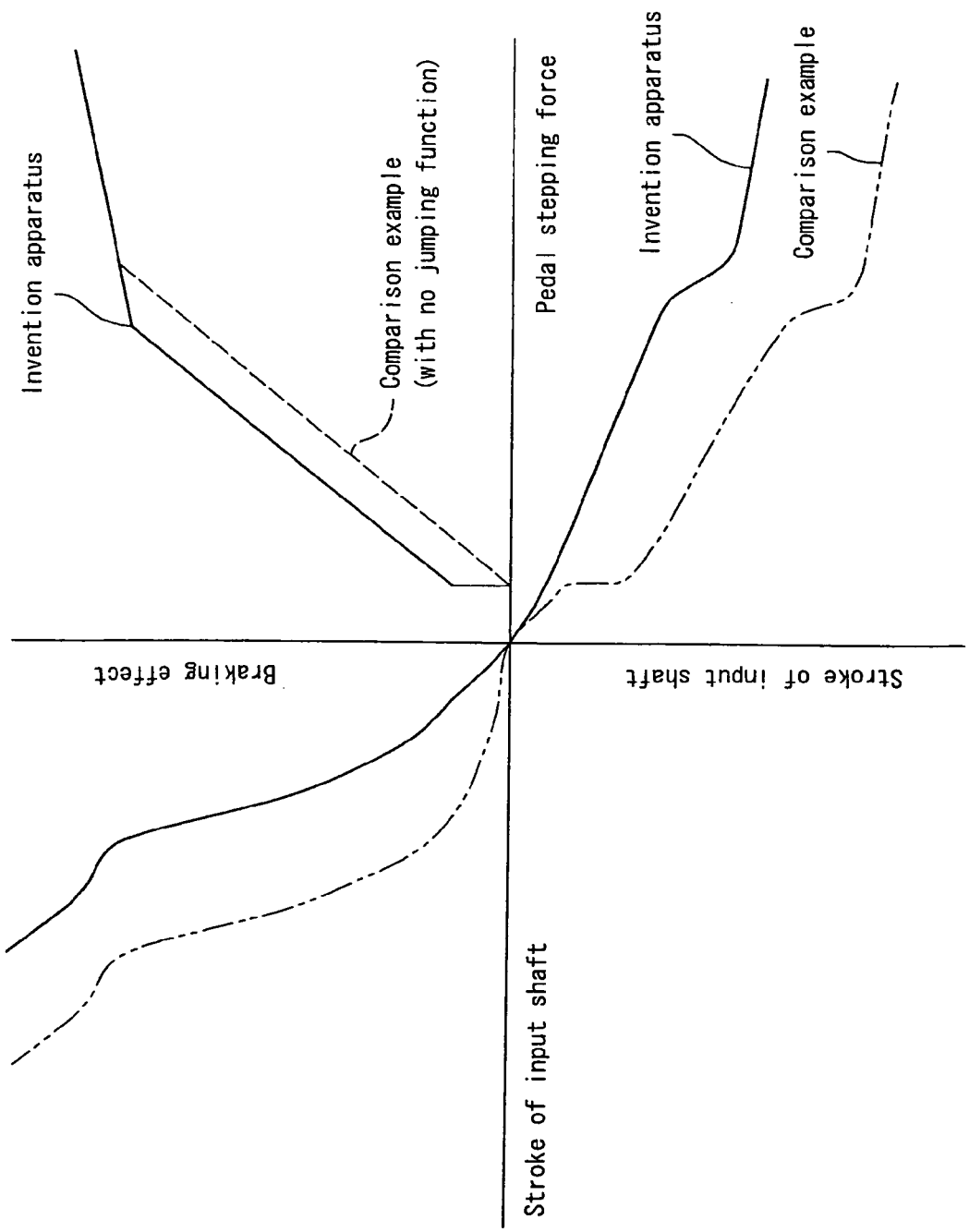
FIG. 12 is a graph showing, for the third embodiment, the relationships between the stroke of the input shaft and the force applied to the brake pedal, between the stroke of the input shaft and the brake hydraulic pressure generated, and between the force applied to the brake pedal and the brake hydraulic pressure generated.

FIG. 12 shows the relationship between the brake pressure generated and the force applied to the brake pedal 20 for the brake hydraulic pressure generator of the third embodiment and a conventional such device having no pressure jump function. As clearly shown in FIG. 12, the pressure jump function serves to increase the brake pressure generated in the initial stage of brake pedal operation.

Figure 13:
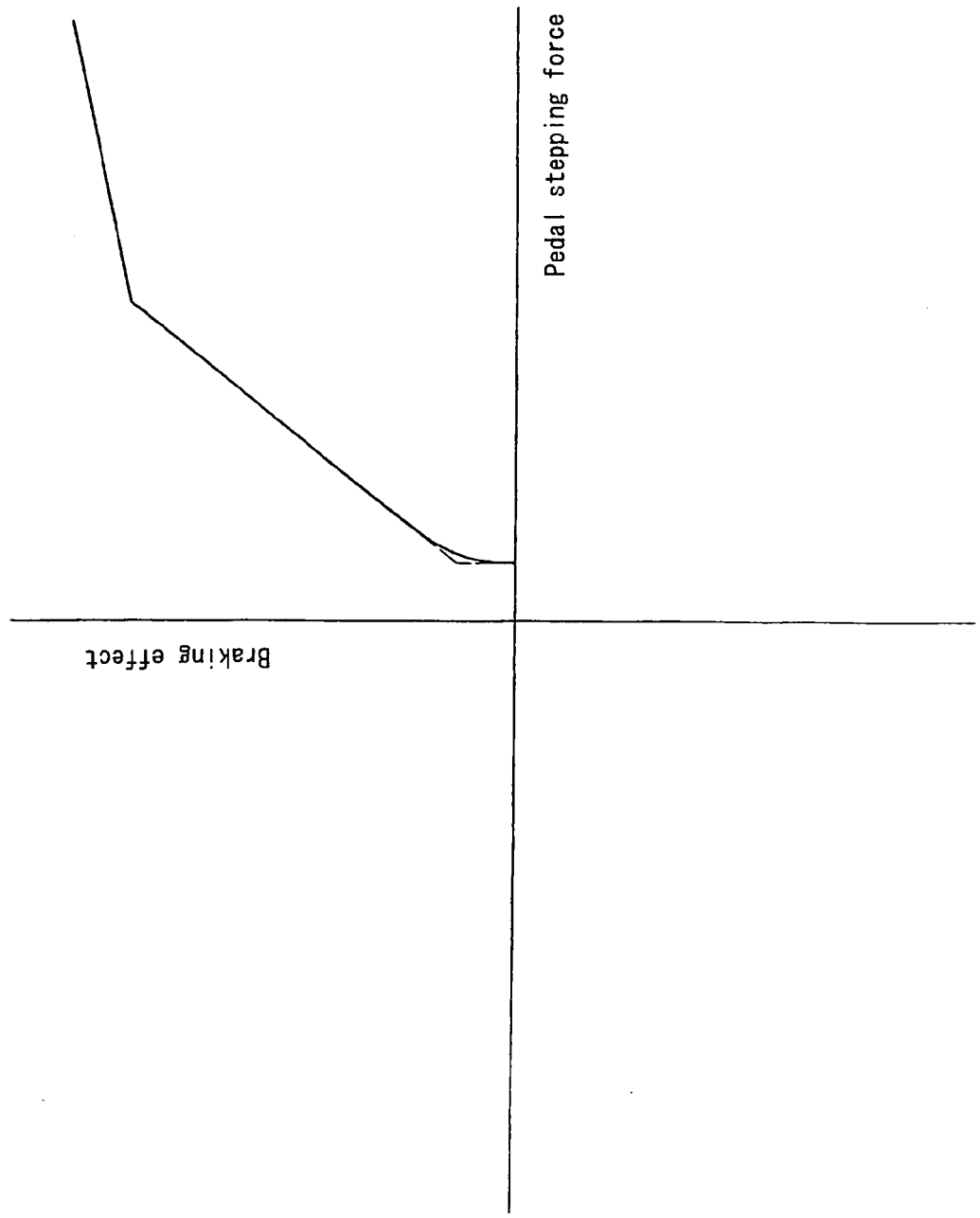
FIG. 13 is a graph showing the relationship between the force applied to the brake pedal and the brake hydraulic pressure generated when an elastic member is used as the element for imparting resistance to movement.
Figure 14:
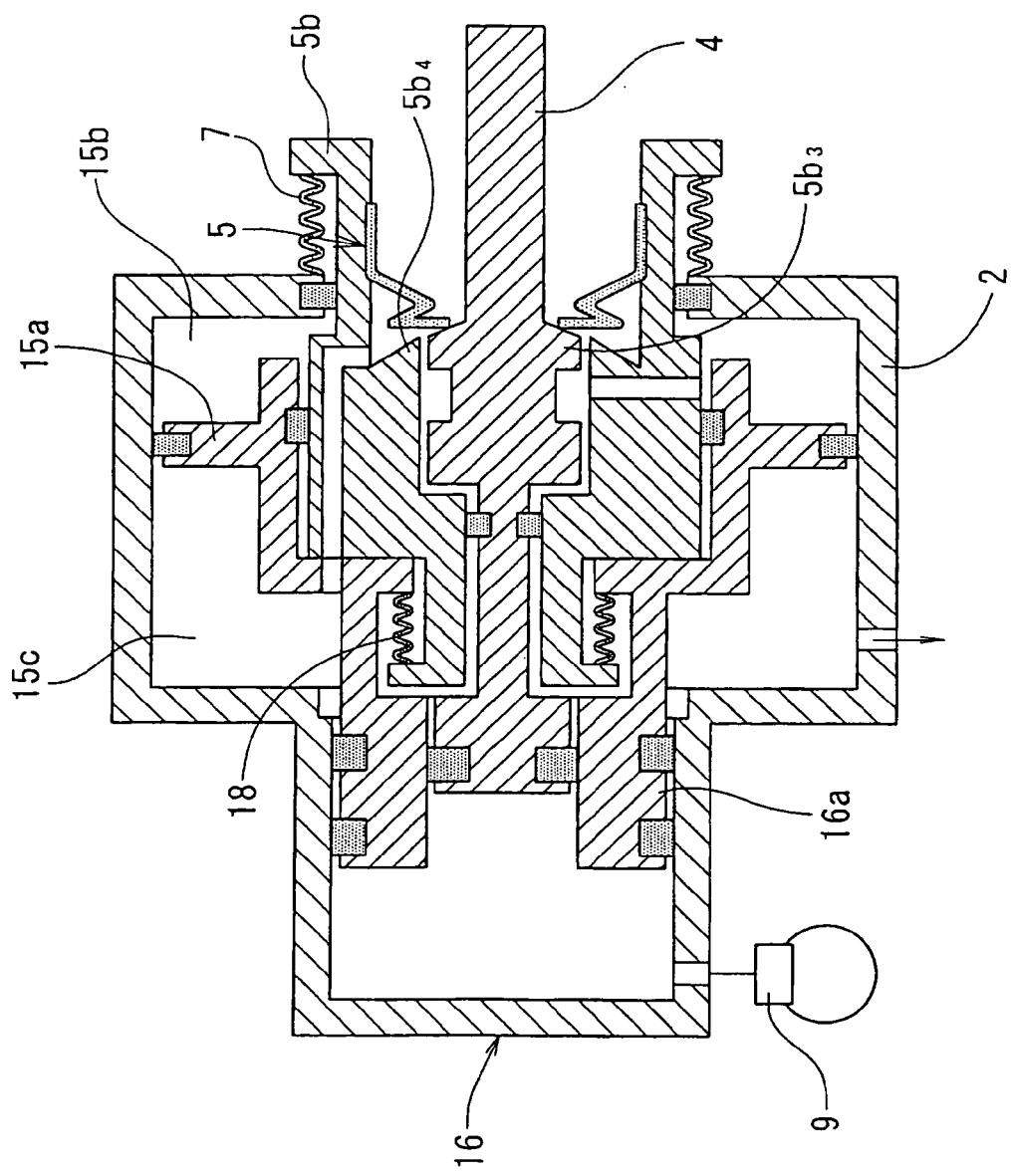
FIG. 14 is a sectional view of a conventional brake hydraulic pressure generator.

FIG. 13 shows the relationship between the brake pressure generated and the force applied to the brake pedal when the means for imparting resistance to movement to the pressure detector member 23 is the elastic member 41. As is apparent from this figure, by using the elastic member 41 as the means for imparting resistance to movement, it is possible to smoothly increase and reduce brake pressure.

When the force applied to the brake pedal increases until the gap 42 disappears, i.e. until the pressure detector member 23 abuts the valve member 40 as shown in FIG. 11, the reaction force from the master cylinder 22 is transmitted to the valve member 40. While the members 23 and 40 are in abutment with each other, the atmospheric valve 39 of the control valve 37 is kept open until the reaction force balances with the input to the valve member 40 from the brake pedal 20, and when the reaction force balances with the input, the negative pressure valve 38 and the atmospheric valve 39 close.

The valve piston 35 is kept in the initial position by the spring 36, irrespective of the position of the power plate 33. The reaction force applied to the brake pedal is adjustable to any desired value by selecting an elastic member 29c having a proper spring constant.

During normal operation, the relations between the force F1 applied to the brake pedal 20, the elastic modulus k1 of the elastic member 29c and the stroke L1 of the input shaft 28 satisfy the equation:

$$L1 = F1/k1 \quad (1)$$

The relations between the stroke L2 of the power plate 33, the output F2 of the power plate 33 and the amount M1 of brake fluid consumed in the brake circuit satisfy the equation:

$$M1 = (F2/P1) \times L2 \quad (2)$$

The control valve 37 adjusts the amount of outer air introduced into the variable pressure chamber 31 such that the pressure applied to the pressure detector member 23 and the power plate 33 is proportional to the area ratio k2=S23/S22 (S22 is the sectional area of the master cylinder piston 22a, and S23 is the sectional area of the pressure detector member 23), irrespective of the amount of brake fluid consumed in the brake circuit. Specifically, the control valve 37 increases the amount of outer air introduced into the variable pressure chamber 31 as the amount M1 of brake fluid consumed in the brake circuit, which is given by the equation (2) above, increases. As the amount of outer air introduced into the chamber 31 increases, the stroke L2 of the power plate 33 increases, thereby balancing the input and the reaction force. Thus, even if the M1 value changes, the pedal force F1 as well as the stroke L1 of the input shaft 28 (brake pedal operating amount) remain unchanged.

[While the Amount of Brake Fluid Consumed in the Brake Circuit and the Hydraulic Pressure are Changing]

When e.g. regenerative cooperative brake control or vehicle stability control (VSC) starts, the brake hydraulic pressure Pw in the wheel brake 27 is controlled by the brake hydraulic pressure control device 26. As a result, the amount of brake fluid consumed in the brake circuit changes from M1 to M2. The control valve 37 now adjusts the pressure difference between the constant pressure chamber 30 and the variable pressure chamber 31, thereby changing the output F2 of the power plate 33 according to the difference between M1 and M2.

For example, if the amount of brake fluid consumed in the brake circuit increases from M1 to M2, the hydraulic pressure P1 in the pressure chamber 22b increases, which increases the reaction force applied to the valve member 40 through the pressure detector member 23. The increased reaction force applied to the valve member 40 causes the negative pressure valve 38 to be opened slightly while keeping the atmospheric valve 39 shut. As a result, the pressure in the variable pressure chamber 31 decreases, causing the power plate 33 to retract. This reduces the output F2 of the power plate 33, which in turn reduces the hydraulic pressure P1 and the reaction force resulting from the hydraulic pressure P1.

The input and the reaction force that act on the valve member 40 thus balance with each other, with the pedal force F1 and the stroke L1 of the input shaft 28 substantially unchanged. The input and the reaction force can also be balanced in the same manner as above when the hydraulic pressure of the brake circuit fluctuates with the input not fluctuating.

As is apparent from FIG. 12, the brake hydraulic pressure generator according to the present invention can produce a greater braking force with a smaller brake pedal operating amount than the conventional one. Thus, even if brake calipers which are less likely to suffer from brake dragging are used to improve fuel economy and/or reduce brake vibrations, a sufficient braking force can be produced without unduly increasing the brake pedal stroke.

[When the Booster Function is Lost]

When the brake pedal 20 is depressed, the stroke simulator 29 moves leftwardly in the figures to push the valve member 40 leftwardly until it abuts the valve piston 35. The input is thus transmitted to the valve piston 35. Since the force of the spring 36 is weaker than the force of the return spring 34, the valve piston 35 advances leftwardly in the figure together with the stroke simulator 29 and the control valve 37 to push the power plate 33. In this state, no negative pressure is being supplied into the constant pressure chamber 30, so that the negative pressure booster 21 is producing no assisting force. But it is possible to generate at least a minimum necessary brake hydraulic pressure with only the manual force applied to the brake pedal by the driver.

The pressure detector member 23 of this embodiment has a bulge 23a similar to the one of the second embodiment. Its function is exactly the same as the function of the bulge of the second embodiment.

According to this invention, when the reaction force applied to the control valve increases as a result of an increase in the amount of brake fluid consumed in the brake circuit, the control valve adjusts the reaction force so as to balance with the input. This suppresses fluctuations in the reaction force and displacement of the pressure detector member due to fluctuations in the reaction force. Thus, fluctuations in the amount of brake fluid consumed in the brake circuit will scarcely cause changes in the brake pedal operating force and the stroke of the input shaft (and thus the stroke of the brake pedal). For the same reason, any fluctuations in the hydraulic pressure in the brake circuit will also scarcely cause changes in the brake pedal operating force and amount.

Even if brake calipers which are less likely to suffer from brake dragging are used to improve fuel economy and/or reduce brake vibrations, a sufficient braking force can be produced without unduly increasing the brake pedal stroke in spite of the fact that such calipers require a larger amount of brake fluid supplied from the master cylinder.

Since the brake pedal feeling is determined solely by the stroke simulator disposed between the input shaft and the control valve, the brake pedal feeling will be scarcely influenced by fluctuations in the brake fluid consumed in the brake circuit.

In the arrangement of the second embodiment, if the booster function is lost, the input to the control valve is transmitted directly to the master cylinder piston while bypassing the power piston. This means that the force of the return spring for the power piston does not act as a reaction force to the input. Thus, manual braking force can be efficiently used to generate brake hydraulic pressure with a minimum loss.

The means for imparting resistance to movement prevents the reaction force from being transmitted to the control valve until the output hydraulic pressure in the master cylinder increases to a predetermined level. Thus, up to this level, it is possible to quickly increase the output hydraulic pressure with less manual braking efforts.

What is claimed is:

1. A brake hydraulic pressure generator comprising a booster, an input element including an input shaft adapted to operate under an operating force applied to a brake operating member, a stroke simulator for imparting a stroke and a reaction force corresponding to an operating amount applied to the brake operating member to said input shaft, and a control valve for adjusting an output of said booster so as to correspond to the operating amount applied to the brake operating member, an output element for receiving the output of said booster, thereby producing an output, said output element being axially movable relative to said input element, a master cylinder including a master piston cylinder slidable therein for defining a pressure chamber for receiving the output of said output element, thereby producing brake hydraulic pressure in said pressure chamber, a pressure detector member being separate from both the input shaft and the stroke simulator and being slidably disposed in the master cylinder piston for sliding movement along an axis relative to the input shaft and the stroke simulator, the pressure detector member having one end thereof directly exposed to said pressure chamber for receiving an output hydraulic pressure of said master cylinder and applying to said control valve a reaction force corresponding to a force applied to said pressure detector member from said master cylinder, wherein said control valve separately receives an input transmitted from the brake operating member through said stroke simulator and said input shaft and the reaction force from said pressure detector member from opposite directions to each other such that said input balances with said reaction force from said pressure detector member.

2. The brake hydraulic pressure generator of claim 1 wherein said output element comprises a power plate, wherein said booster is a negative pressure booster comprising a variable pressure chamber into which atmospheric air is adapted to be introduced, and a constant pressure chamber adapted to be connected to a negative pressure source, the pressures of said variable pressure chamber and said constant pressure chamber acting on said power plate from opposite directions to each other such that said power plate is biased under the pressure difference between said variable pressure chamber and said constant pressure chamber, and wherein said control valve is structured to absorb any fluctuations in said reaction force from said pressure detector member due to fluctuations in the amount of brake fluid consumed in a brake circuit adapted to be connected to said master cylinder, and fluctuations in a hydraulic pressure in said master cylinder by changing the stroke of said power plate.

3. The brake hydraulic pressure generator of claim 2 wherein said input element further comprises a valve piston in which are received said stroke simulator and said control valve, and wherein said control valve comprises a negative pressure valve including a valve seat formed on said valve piston and a valve body movable into and out of contact with said valve seat for opening and closing a passage through which said variable pressure chamber and said constant pressure chamber communicate with each other, and an atmospheric valve including a valve member and said valve body, said valve member and said valve body being movable into and out of contact with each other for opening and closing a passage through which said variable pressure chamber communicates with outer air, said valve member being movable relative to said valve seat and said valve body to a position where said reaction force from said pressure detector member and said input balance with each other, thereby selectively opening and closing said negative pressure valve or said atmospheric valve by selectively bringing said valve body into or out of contact with said valve member or said valve seat when the amount of brake fluid consumed in the brake circuit, or the hydraulic pressure in said master cylinder fluctuates, and as a result, said reaction force from said pressure detector member is changed.

* * * * *